(12) United States Patent
Heilig

(10) Patent No.: US 11,207,625 B2
(45) Date of Patent: Dec. 28, 2021

(54) AIR FILTER CLEANING DEVICE AND PARTS AND METHODS OF USE THEREOF

(71) Applicant: MAX XP PTY LTD, Emu Park (AU)

(72) Inventor: Graham Edward Heilig, Emu Park (AU)

(73) Assignee: MAX XP PTY LTD, Queensland (AU)

( * ) Notice: Subject to any disclaimer, the term of this patent is extended or adjusted under 35 U.S.C. 154(b) by 233 days.

(21) Appl. No.: 16/484,929

(22) PCT Filed: Feb. 15, 2018

(86) PCT No.: PCT/AU2018/050126
§ 371 (c)(1),
(2) Date: Aug. 9, 2019

(87) PCT Pub. No.: WO2018/148802
PCT Pub. Date: Aug. 23, 2018

(65) Prior Publication Data
US 2019/0381435 A1 Dec. 19, 2019

(30) Foreign Application Priority Data
Feb. 17, 2017 (AU) .............................. 2017900527

(51) Int. Cl.
*B01D 46/00* (2006.01)
*B01D 46/04* (2006.01)
(Continued)

(52) U.S. Cl.
CPC ............ *B01D 41/04* (2013.01); *B01D 46/04* (2013.01); *B01D 46/0068* (2013.01);
(Continued)

(58) Field of Classification Search
CPC .... B01D 41/04; B01D 46/04; B01D 46/0068; B01D 46/10; B01D 46/21; B01D 2273/18
(Continued)

(56) References Cited

U.S. PATENT DOCUMENTS 5,143,529 A * 9/1992 Means, Jr. ............. B01D 41/04
55/290
7,419,520 B2 * 9/2008 Lee ....................... A47L 9/0081
55/282

(Continued)

FOREIGN PATENT DOCUMENTS

DE 19632970 A1 2/1997

OTHER PUBLICATIONS

International Search Report and Written Opinion issued in connection with International Patent Application No. PCT/AU2018/050126, 9 pages, dated Apr. 24, 2018.

*Primary Examiner* — Minh Chau T Pham
(74) *Attorney, Agent, or Firm* — Duane Morris LLP

(57) ABSTRACT

The present invention concerns an air filter cleaning device having a rotating stage on which an air filter to be cleaned is seated and rotated about its central axis; and an inner outlet head configured to extend through a central opening of the rotating stage and be vertically moveable between a lower position and an upper position at least parallel to the central axis of the air filter, said outlet head having at least one gas outlet for discharging pressurized air outwardly through at least one wall of the air filter for dislodging contaminants; an outer vacuum head located externally to the air filter for suctioning the contaminants dislodged from the air filter by the inner outlet head wherein the inner outlet head is further configured such that the lower position is located less than about 1,500 mm above a support surface for the cleaning device.

28 Claims, 5 Drawing Sheets

(51) Int. Cl.
*B01D 46/10* (2006.01)
*B01D 46/26* (2006.01)
*B01D 41/04* (2006.01)

(52) U.S. Cl.
CPC .............. *B01D 46/10* (2013.01); *B01D 46/26* (2013.01); *B01D 2273/18* (2013.01)

(58) Field of Classification Search
USPC ............ 55/302, 294; 95/280; 15/304, 316.1, 15/321, 352; 134/168 R, 172, 175, 198; 210/391, 393, 394
See application file for complete search history.

(56) References Cited

U.S. PATENT DOCUMENTS

| | | | |
|---|---|---|---|
| 8,236,076 B2 * | 8/2012 | Grieve | B01D 41/04 55/294 |
| 8,499,409 B2 * | 8/2013 | Reining | B01D 46/0068 15/304 |
| 2005/0217067 A1 * | 10/2005 | Rew | A47L 9/20 15/352 |
| 2014/0251387 A1 * | 9/2014 | Royce | B01D 46/0073 134/33 |
| 2017/0172366 A1 * | 6/2017 | Rukavina | A47L 9/122 |
| 2017/0251894 A1 * | 9/2017 | Kim | A47L 5/28 |

* cited by examiner

AIR FILTER CLEANING DEVICE AND PARTS AND METHODS OF USE THEREOF

CROSS REFERENCE TO RELATED APPLICATIONS

This application is a National Stage Application, filed under 35 U.S.C. 371, of International Patent Application No. PCT/AU2018/050126, filed on Feb. 15, 2018, which claims priority to Australian Patent Application No. 2017900527, filed on Feb. 17, 2017, contents of both of which are incorporated herein by reference in their entireties.

TECHNICAL FIELD

The present invention relates to an air filter cleaning device and parts and methods of use thereof.

BACKGROUND

Modern air filter cleaning is a vital and key component in the economic cost of running any machinery. Typically, air filters are expensive to replace. Moreover, unclean or defective air filters can result in a reduction in fuel efficiency and possibly engine failure.

Air filters can either be wet cleaned or dry cleaned. Wet cleaning involves immersion of the dirty air filter in a detergent bath to dissolve contaminants whereas dry cleaning involves the use of pressurised air to dislodge contaminants from the dirty air filter.

A typical dry air filter cleaning device comprises: a rotating stage on which a dirty air filter is seated and rotated about its central axis; at least one inner nozzle head having at least one nozzle for discharging pressurised air outwardly through a wall of the air filter for dislodging contaminants; and a vacuum head to suction contaminants dislodged by the pressurised air. The inner nozzle head is generally operably coupled to a hydraulic or pneumatic ram and is vertically moveable along the central axis of the air filter. The rotating stage and the inner outlet head are typically arranged at a minimum height of about about 1,500 mm above a support surface for the device.

A problem with dry air filter cleaning devices as described above is that an operator is required to lift each air filter a minimum of at least about 1,500 mm to seat the air filter atop the rotating stage. Although this may not be too difficult as a once-off, it quickly becomes labour-intensive and a source of potential injury when each air filter weighs on average about 22 kilograms and about 70 such air filters may be cleaned each day.

It will be clearly understood that, if a prior art publication is referred to herein, this reference does not constitute an admission that the publication forms part of the common general knowledge in the art in Australia or in any other country.

OBJECT OF THE INVENTION

There is a need for a device which solves, or at least ameliorates the aforementioned problems. Accordingly, the object of the present invention is to provide a bucket which is more versatile than currently available air filter cleaning devices which may at least partially overcome at least one of the abovementioned disadvantages or provide the consumer with a useful or commercial choice.

SUMMARY OF INVENTION

With the foregoing in view, the present invention in one form, resides broadly in an air filter cleaning device comprising:

a rotating stage on which an air filter to be cleaned is seated and rotated about its central axis, said rotating stage comprising a central opening;

an inner outlet head configured to extend through the central opening of the rotating stage and be vertically moveable between a lower position and an upper position at least parallel to the central axis of the air filter seated atop the rotating stage, said inner outlet head having at least one gas outlet for discharging pressurised gas outwardly through at least one wall of the air filter for dislodging contaminants; and an outer vacuum head located externally to the air filter to suction the contaminants dislodged from the air filter by the inner outlet head, wherein said inner outlet head, when in the lower position, is configured to be located less than about 1,500 mm above a support surface for the air filter cleaning device.

In the present specification and claims (if any), the word "comprising" and its derivatives comprising "comprises" and "comprise" comprise each of the stated integers but does not exclude the inclusion of one or more further integers.

For the purposes of the specification, the term "air filter" means a device composed of fibrous materials which removes solid particulates such as dust, pollen, mould, and bacteria from the air and may include vehicle filters, such as those used in air boxes or exhaust systems (such as diesel particulate filter (DPF)), or industrial filters, such as heating, ventilation, and air conditioning (HVAC) units.

According to a second aspect of the present invention, there is provided an inner outlet head for use or when used with the air filter cleaning device of the first aspect, said inner outlet head configured to extend through a central opening of a rotating stage of the air filter cleaning device and be vertically moveable between a lower position and an upper position at least parallel to a central axis of a air filter seated atop the rotating stage, said inner outlet head having at least one gas outlet for discharging pressurised gas outwardly through at least one wall of the air filter for dislodging contaminants, said inner outlet head further configured to be located less than about 1,500 mm above a support surface for the air filter cleaning device when in the lower position.

Advantageously, the air filter cleaning device of the present invention by providing the rotating stage and the inner nozzle head, when in the lower position, at a height of less than about 1,500 mm, greatly improves the usability of the cleaning device over existing air filter cleaning devices. By having a height of less than about 1,500 mm, an operator is not required to lift each dirty air filter as greater distance as with existing air filter cleaning devices thereby making the cleaning process less labour intensive. This is particularly important when each dirty air filter weighs, on average, about 22 kg and about 70 dirty air filters may be cleaned each day. Moreover, by making the process less labour intensive, the cleaning device of the present invention provides a safer alternative to existing air filter cleaning devices by reducing an operator's risk of injury.

Preferably, the air filter to be cleaned is a cylindrical air filter, which, in use, generally forms part of a unit called an air cleaner for preventing abrasive particulate matter from entering an engine's cylinders.

Each air filter may typically comprise at least one filter media selected from paper, foam, cotton, stainless steel mesh or any combination thereof. The filter media may be arranged in a tubular shape having at least one inner sidewall and at least one opposed outer sidewall.

Generally, each air filter may comprise opposed annular shaped end members located at each end of the at least one filter media. Each end member may further comprise one or more gaskets to assist in fitting and sealing the air filter in place in the air cleaner of an engine.

The air filter cleaning device of the present invention may be of any suitable size, shape and construction and may be formed from any suitable material or materials.

The air filter cleaning device may preferably comprise a frame. The frame may be of any suitable size, shape and construction and may typically serve as a platform for supporting one or more components of the device.

Generally, the frame may be formed from metal and may be formed from a plurality of frame members joined together. Each frame member may have an elongate shape. The frame members may be linear, curved or a combination thereof.

Typically, the frame may comprise at least three vertically extending frame members joined together by a plurality of horizontally extending frame members.

The frame members may be of tubular or solid construction, typically tubular with a substantially square-shaped cross-section. Generally, the various frame members are permanently joined together using conventional welding techniques.

In some embodiments, a lower end of each vertically extending frame member may be configured to rest on a support surface (such as, e.g., a floor) and support the frame in an erect position. In some such embodiments, a rubber or plastic foot may be associated with the lower end of each vertically extending frame member for resting on the support surface.

In yet other embodiments, one or more horizontally extending frame members may extend between the lower ends of the vertically extending frame members and a support surface facing wall of each of the one or more horizontally extending frame members may rest on the support surface to support the frame in an erect position.

The rotating stage may be of any suitable size, shape and construction for supporting an air filter and rotating about a central axis of rotation. Likewise, the rotating stage may be formed from any suitable material or materials.

Generally, the rotating stage may be formed from a metal and/or plastic material or materials and may have a rectangular, square, polygonal, oval or circular shape, preferably circular.

Typically, the rotating stage may be substantially disc-shaped. The rotating stage may have two opposed surfaces comprising an upper surface and an opposed lower surface. The opposed surfaces may be substantially parallel to one another and be interconnected by at least one side edge.

As indicated above, the rotating stage comprises a central opening. The central opening may be of any suitable size and shape to allow the inner outlet head to extend through the opening. The central opening may typically be defined in a central portion of the rotating stage, preferably the central opening may co-align with the axis of rotation of the rotating stage.

Generally, the rotating stage may be rotatably coupled to the frame such that it may rotate about its axis of rotation in a substantially horizontal plane. The rotating stage may be rotatably coupled to the frame of the device in any suitable way.

For example, the rotating stage may comprise an upper portion and a lower portion. The lower portion may be configured to be fastened to a part of the frame of the device, either directly or indirectly. The upper portion, comprising the two opposed surfaces and the at least one side edge, may be configured to be rotatable relative to the lower portion. For example, the portions may be rotatably coupled by axially overlapping coupling parts coupled together by an outer sleeve or by a retaining portion of one coupling part received and retained in the other coupling part.

In some embodiments, the lower portion of the rotating stage may be fastened to one or more of the horizontally extending frame members of the frame of the device. The lower portion may be fastened to the one or more of the horizontally extending frame members of the frame by one or more fasteners, such as, e.g., one or more mechanical fasteners and/or one or more chemical fasteners.

For example, in one such embodiment, the lower portion of the rotating stage may be fastened to the one or more horizontally extending frame members by one or more chemical fasteners. For example, the one or more chemical fasteners comprising a wet adhesive, a dry adhesive and/or double-sided adhesive tape may extend between an upper portion or part of the one or more of the horizontally extending frame members and an underside of the lower portion of the rotating stage.

In another such embodiment, the lower portion of the rotating stage may be fastened to the one or more horizontally extending frame members by one or more mechanical fasteners. For example, one or more threaded fasteners may extend through respective openings defined in the lower portion of the rotating stage and within openings defined in the one or more horizontally extending frame members.

In other embodiments, the rotating stage may be rotatably coupled to a panel supported by the frame. In one such embodiment, the rotating stage may be rotatably coupled to a panel fastened atop one or more horizontally extending frame members with one or more fasteners as described above.

The rotating stage may be coupled to the frame at any suitable height above the support surface. Generally, however, the rotating stage may be coupled to the frame at a height that corresponds with a height of the inner outlet head when in the lower position. As such, the rotating stage may typically be located at a height less than about 1,500 mm above the support surface.

For example, the rotating stage may be located at a height less than 1,475 mm, less than 1,450 mm, less than 1,425 mm, less than 1,400 mm, less than 1,375 mm, less than 1,350 mm, less than 1,325 mm, less than 1,300 mm, less than 1,275 mm, less than 1,250 mm, less than 1,225 mm, less than 1,200 mm, less than 1,175 mm, less than 1,150 mm, less than 1,125 mm, less than 1,100 mm, less than 1,075 mm, less than 1,050 mm, less than 1,025 mm, less than 1,000 mm, less than 975 mm, less than 950 mm, less than 925 mm, less than 900 mm, less than 875 mm, less than 850 mm, less than 825 mm, less than 800 mm, less than 775 mm, less than 750 mm, less than 725 mm, less than 700 mm, less than 675 mm, less than 650 mm, less than 625 mm, less than 600 mm, less than 575 mm, less than 550 mm, less than 525 mm, less than 500 mm, less than 475 mm, less than 450 mm, less than 425 mm, less than 400 mm, less than 375 mm, less than 350 mm, less than 325 mm or less than 300 mm above the support surface.

The rotating stage may be manually rotated about its axis of rotation or rotation may be driven, preferably the latter. In preferred embodiments, rotation of the rotating stage may be driven by a drive motor operably coupled to the frame and the rotating stage, preferably an electric drive motor. However, the motor could be in the form of a pneumatic or hydraulic powered motor without departing from the scope of the present invention. The motor may be controlled as part of a servomotor comprising a closed-loop servomechanism that uses position feedback to control its motion and final position or via a programmable logic controller (PLC).

As indicated above, the device comprises an inner outlet head configured to extend through the central opening of the rotating stage and be vertically moveable between a lower position and an upper position at least parallel to the central axis of a air filter seated atop the rotating stage, preferably along the central axis.

The inner outlet head may have the at least one gas outlet and may be of any suitable shape, size and construction and may be formed from any suitable material or materials, such as, e.g., plastics, metals or a combination thereof. The inner outlet head may be of unitary construction or formed from two or more outlet head pieces.

Generally, the inner outlet head may comprise a body having a gas inlet, the at least one gas outlet and a passage in fluid communication with the gas inlet and the at least one gas outlet.

The gas inlet is preferably connectable to a source of gas by a tube, pipe or hose. The gas inlet may be connectable to the tube, pipe or hose by any suitable means. For example, the gas inlet may have a quick coupling or may be barbed for connecting to the tube, pipe or hose. Preferably, the gas inlet may be barbed for connecting to the tube, pipe or hose, which may be secured in place by a hose clamp or clip.

The source of gas may preferably be in the form of compressed air provided by a compressor or the like.

The compressed air may be delivered to the gas inlet at a pressure of between about 15 psi to about 900 psi, about 20 psi to about 900 psi, about 25 psi to about 900 psi, about 30 psi to about 900 psi, about 35 psi to about 900 psi, about 40 psi to about 900 psi, about 45 psi to about 900 psi, about 50 psi to about 900 psi, about 55 psi to about 900 psi, about 60 psi and about 900 psi, about 65 psi and about 900 psi, about 70 psi and about 900 psi, about 75 psi and about 900 psi, about 80 psi and about 900 psi, about 85 psi and about 900 psi, about 90 psi and about 900 psi, about 100 psi and about 900 psi, about 105 psi and about 900 psi, about 110 psi and about 900 psi, about 115 psi and about 900 psi, about 120 psi and about 900 psi, about 125 psi and about 900 psi, about 130 psi and about 900 psi, about 135 psi and about 900 psi, about 140 psi and about 900 psi, about 145 psi and about 900 psi or about 150 psi and about 900 psi. Preferably, the air compressor may deliver compressed air at an operational pressure of between about 60 psi and about 500 psi, more preferably between about 60 psi and about 350 psi.

The gas outlet may be of any suitable size, shape and construction. Preferably, the at least one gas outlet may be in the form of a nozzle.

The nozzle may be of any suitable size, shape and configuration to at least partially achieve or fulfil its designated purpose of discharging pressurised gas for dislodging contaminants from an air filter. The nozzle may be formed from one or more nozzle pieces. Typically, each nozzle may be formed from metal and/or plastics material or materials. The nozzle may be detachable.

In some embodiments, the outlet head may comprise more than one gas outlet. For example, the outlet head may comprise at least two nozzles, at least three nozzles, at least four nozzles, at least five nozzles, at least six nozzles, at least seven nozzles, at least eight nozzles, at least nine nozzles or even at least 10 nozzles. In such embodiments, the passage in the body of the outlet head may comprise one or more forks in fluid communication between the gas inlet and the more than one gas outlet.

In preferred embodiments, the inner outlet head may comprise at least three nozzles. The at least three nozzles may be arranged in any suitable arrangement on the outlet head. Typically, the at least three nozzles may be arranged on a same side of the outlet head, preferably serially arranged along a height of the outlet head.

Typically, the inner outlet head may be operatively associated with an elongate support for vertically moving the inner outlet head between the lower and upper positions. The elongate support may enable the inner outlet head to be located at a height of less than about 1,500 mm above the support surface for the device when in the lower position.

For example, the inner outlet head may have a lower position height of less than about 1,500 mm, less than 1,475 mm, less than 1,450 mm, less than 1,425 mm, less than 1,400 mm, less than 1,375 mm, less than 1,350 mm, less than 1,325 mm, less than 1,300 mm, less than 1,275 mm, less than 1,250 mm, less than 1,225 mm, less than 1,200 mm, less than 1,175 mm, less than 1,150 mm, less than 1,125 mm, less than 1,100 mm, less than 1,075 mm, less than 1,050 mm, less than 1,025 mm, less than 1,000 mm, less than 975 mm, less than 950 mm, less than 925 mm, less than 900 mm, less than 875 mm, less than 850 mm, less than 825 mm, less than 800 mm, less than 775 mm, less than 750 mm, less than 725 mm, less than 700 mm, less than 675 mm, less than 650 mm, less than 625 mm, less than 600 mm, less than 575 mm, less than 550 mm, less than 525 mm, less than 500 mm, less than 475 mm, less than 450 mm, less than 425 mm, less than 400 mm, less than 375 mm, less than 350 mm, less than 325 mm or less than 300 mm above the support surface. Typically, the inner outlet head may have a lower position height of less than 1,000 mm above the support surface, preferably less than 800 mm, more preferably the inner outlet head may be located at a height of about 750 mm above the support surface.

Preferably, the inner outlet head, when in the lower position, may be located at substantially the same height above the support surface as the rotating stage such that an upper surface of the inner outlet head may lie substantially flush with the upper surface of the rotating stage.

Likewise, the inner outlet head may have an upper position that suitably corresponds with an upper edge or rim of an air filter seated atop the rotating stage. In this regard, the elongate support may be of any suitable size, shape and form allowing a suitable range of vertical movement between the lower position and the upper position.

For example, the elongate support may allow a range of vertical movement of at least 50 mm, at least 100 mm, at least 150 mm, at least 200 mm, at least 250 mm, at least 300 mm, at least 350 mm, at least 400 mm, at least 450 mm, at least 500 mm, at least 550 mm, at least 600 mm, at least 650 mm, at least 700 mm, at least 750 mm, at least 800 mm, at least 850 mm, at least 900 mm, at least 950 mm, at least 1,000 mm, at least 1,050 mm, at least 1,100 mm, at least 1,150 mm, at least 1,200 mm, at least 1,250 mm, at least 1,300 mm, at least 1,350 mm, at least 1,400 mm, at least 1,450 mm or at least about 1,500 mm between the lower position and the upper position. Preferably, the elongate support may allow a range of vertical movement of about 750 mm between the lower position and the upper position of the inner outlet head.

In some embodiments, the elongate support may comprise an upper end operatively coupled to the inner outlet head and an opposed lower end associated with the frame of the device. The lower end may be directly or indirectly associated with the frame.

The elongate support may preferably have an adjustable longitudinal length or height for vertically moving the inner outlet head, operatively coupled to the upper end, between the lower and upper positions. The longitudinal length or height of the elongate support may be adjustable by any suitable means.

In some such embodiments, the elongate support may comprise two or more telescopic members capable of moving between an extended position and a retracted position. The extended position may correspond with the upper position and the retracted position may correspond with the lower position. The telescopic members may be manually moved between the extended and retracted positions or may be driven, for example.

In other such embodiments, the elongate support may be in the form of a linear actuator capable of moving between an extended position and a retracted position. The extended position may again correspond with the upper position and the retracted position may again correspond with the lower position. The linear actuator may be manually moved between the positions or may be powered. The linear actuator may be a pneumatic or hydraulic ram, for example. Conversely, the linear actuator may be a servomotor or stepper motor configured to raise and lower the elongate support between the extended and retracted positions.

Preferably, the linear actuator may be a rigid chain actuator (also known as linear chain actuator, push-pull chain actuator, electric chain actuator, zip chain actuator or column-forming chain actuator). The rigid chain actuator allows the inner outlet head to be located at a height of less than about 1,500 mm above the support surface as the rigid chain actuator requires less space than other linear actuator types.

Generally, the rigid chain actuator may comprise at least one housing, a pinion at least partially housed in the housing and at least one chain also at least partially housed in the housing and operatively associated with the pinion such that when the pinion rotates the chain moves between the extended position in which the chain extends vertically upwardly from the housing in a rigid linear column form and the retracted position in which the chain is at least partially retracted into the housing and folds on itself. The chain is typically a limited-articulation chain articulated in such a way that each link is only able to deflect to only one side from a linear arrangement relative to the other links.

In some embodiments, the rigid chain actuator may comprise a single chain coupled at one end to the inner outlet head such that rotation of the pinion moves the chain between an extended column position in which the inner outlet head extends in a substantially vertical direction upwardly from the housing in the upper position and a retracted position in which the chain is at least partially retracted within the housing causing the inner outlet head to retract in a substantially vertical direction downwardly at least partially into the rotating stage in the lower position.

In other embodiments, the rigid chain actuator may comprise a pair of interlocking chains each coupled at a common end to the inner outlet head such that rotation of a pinion associated with each chain moves the chains between an extended column position in which the chains interlock with one another in a back-to-back arrangement and extend the inner outlet head in a substantially vertical direction upwardly from the at least one housing, preferably at least two respective housings, in the upper position and a retracted position in which the chains at least partially disengage from one another and at least partially retract into the housings causing the inner outlet head to retract in a substantially vertical direction downwardly at least partially into the rotating stage in the lower position. In such embodiments, the rigid chain actuator may comprise at least one pinion operatively coupled to each chain. The at least one pinion may be configured to achieve a 5:1 gear ratio (i.e. one rotation of the pinion achieving 5 times movement of the at least one chain) to achieve rapid actuation of the rigid chain actuator.

Typically, each pinion is mounted on a machined drive shaft within the housing. The drive shaft may be manually driven or may be driven by a motor, preferably an electric motor. The at least one housing of the rigid chain actuator may be located beneath the rotating stage, typically fastened to the frame or to a panel supported by the frame.

In some embodiments, the housing may be fastened to one or more frame members of the frame of the device with one or more fasteners as described above.

In other embodiments, the housing may be fastened to a panel supported by the frame. For example, the housing may be fastened to an underside of a panel fastened atop one or more horizontally extending frame members, typically again with one or more fasteners as described above.

In some such embodiments, the housing may be fastened to the underside of the same panel as the rotating stage.

As indicated above, the air filter cleaning device of the present invention comprises an outer vacuum head located externally to an air filter seated atop the rotating stage to suction contaminants dislodged from the air filter by the inner outlet head.

The vacuum head may be of any suitable size, shape and construction and formed from any suitable material or materials such as, e.g., plastics, metals or a combination thereof.

The vacuum head may be of unitary construction or formed from two or more vacuum head pieces.

Generally, the vacuum head may comprise a body having at least one gas inlet, a gas outlet and a passage in fluid communication with the at least one gas inlet and the gas outlet.

Preferably, the vacuum head may comprise a hinge and at least one compression spring configured to achieve spring loaded opening of the vacuum head for easy positioning of a filter over the linear actuator.

The gas outlet is preferably connectable to an air pump for creating a partial vacuum and a container for containing contaminants removed by the outer vacuum head. The gas outlet may be connectable to the air pump and the container by a tube, pipe or hose. The gas outlet may be connectable to the tube, pipe or hose by any suitable means. For example, the gas outlet may have a quick coupling or may be barbed for connecting to the tube, pipe or hose.

The at least one gas inlet may be of any suitable size, shape and construction to at least partially achieve or fulfil its designated purpose of suctioning contaminants dislodged from an air filter.

In some embodiments, the outer vacuum head may comprise more than one gas inlet. For example, the vacuum head may comprise at least two inlets, at least three inlets, at least four inlets, at least five inlets, at least six inlets, at least seven inlets, at least eight inlets, at least nine inlets or even at least 10 inlets. In such embodiments, the passage in the body of the vacuum head may comprise one or more forks in fluid communication between the more than one gas inlet and the gas outlet.

The vacuum head may be located in any suitable location relative to the air filter and/or the inner outlet head. Typically, the vacuum head may be mounted in the device such that it faces a longitudinal side of the air filter, preferably facing the inner outlet head.

In preferred embodiments, the vacuum head may at least partially extend through an opening defined in a vertical panel wall fitted to the frame of the device and facing the inner outlet head. The opening may be of any suitable size and shape to allow the vacuum head to at least partially extend through the vertical panel wall.

Typically, the opening may be an elongate opening configured to allow the vacuum head to be moved in a substantially vertical direction to at least mirror the movement of the inner outlet head. In such embodiments, the vacuum head may be mounted to a moveable arm for moving the vacuum head in the substantially vertical direction.

In some embodiments, at least one sealing member may be applied between an edge of the opening and the vacuum head to at least partially prevent contaminants passing around the vacuum head and to an opposite side of the vertical panel wall.

In some embodiments, the device may comprise an enclosure for at least partially enclosing a cleaning chamber comprising the rotating stage and at least part of the inner outlet head and the outer vacuum head.

The enclosure may be of any suitable size, shape and construction. Typically, the enclosure may comprise two or more panels fastened to the frame with one or more fasteners as described above. The two or more panels may be formed from plastic and/or metal material and/or materials.

In some embodiments, at least one of the panels forming the enclosure may be at least partially transparent to allow an operator to view an interior of the enclosure.

In preferred embodiments, at least one of the panels may be hingedly connected to the frame so that the panel may function as a door for at least allowing air filters to be interchangeably placed atop the rotating stage for cleaning, for example.

According to a third aspect of the present invention, there is provided a method of cleaning a air filter, said method comprising:

seating the air filter atop the rotating stage of the air filter cleaning device of the first aspect;

discharging pressurised gas outwardly through at least one wall of the air filter with the at least one gas outlet of the inner outlet head to dislodge contaminants from the air filter while the air filter rotates atop the rotating stage and the inner outlet head moves vertically between the lower position and the upper position at least parallel to a central axis of the air filter; and optionally, suctioning contaminants dislodged from the at least one wall of the air filter with the outer vacuum head.

The method may comprise one or more characteristics of the device and parts thereof as hereinbefore described.

In some embodiments, the method may comprise an initial step of measuring a first pressure drop across said air filter with a first pressure differential test.

Generally, the seating may comprise aligning the air filter such that its central axis at least partially aligns with the axis of rotation of the rotating stage.

The discharging may typically comprise discharging pressurised air through the at least one wall of the air filter.

In preferred embodiments, the inner outlet head may move between the lower and upper positions along the central axis of the air filter.

In preferred embodiments, the method may comprise said suctioning of said contaminants dislodged from the at least one wall of the air filter.

Preferably, said suctioning may occur contemporaneously with said discharging of pressurised gas.

In some embodiments, the method may further comprise measuring a second pressure drop across said air filter following said discharging with a second pressure differential test.

If the pressure drop across the air filter falls within an allowable range, the air filter may be considered clean and ready to be re-used.

If, however, the pressure drop across the air filter does not fall within an allowable range or does not exhibit a significant improvement over the pressure drop measured during the first pressure differential test, said discharging and said suctioning may be repeated.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

Figure 1:
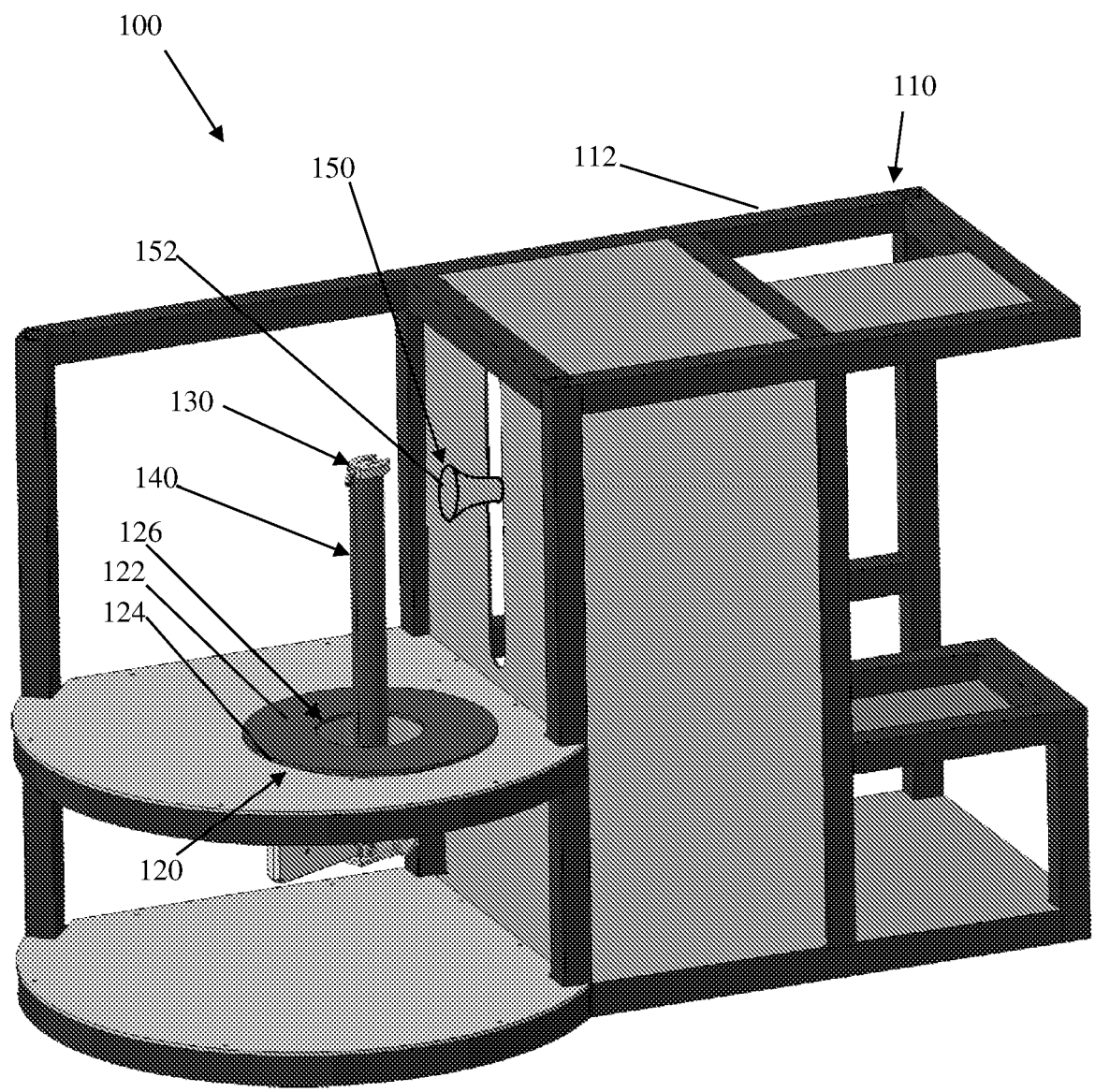
FIG. 1 is an upper perspective view of an air filter cleaning device according to an embodiment of the present invention.

FIG. 1 shows an air filter cleaning device (100) according to an embodiment of the present invention.

The air filter cleaning device (100) comprises: a frame (110); a rotating stage (120) on which a cylindrical air filter to be cleaned is seated and rotated about its central axis; an inner nozzle head (130; i.e., an inner outlet head) having three nozzles (132) for discharging pressurised air outwardly through at least one wall of the cylindrical air filter for dislodging contaminants; a rigid chain actuator (140; i.e., an elongate support) operably coupled to the inner nozzle head (130) for vertically moving the inner nozzle head (130) between a lower position and an upper position at least parallel to the central axis of the cylindrical air filter; and an outer vacuum head (150) located externally to the cylindrical air filter to suction the contaminants dislodged from the cylindrical air filter, wherein the inner nozzle head (130) is configured to be located about 750 mm above a support surface when in the lower position.

The frame (110) is formed from metal and comprises a plurality of vertically- and horizontally-extending frame members (112) joined together. The frame members (112) are of a tubular construction with substantially square-shaped cross-section. The various frame members (112) are permanently joined together using conventional welding techniques.

The rotating stage (120) is formed of metal and/or plastic material or materials and is substantially disc-shaped, comprising an upper portion and a lower portion. The lower portion is fastened is to a horizontal panel supported by the frame (110). The upper portion is rotatably coupled to the lower portion and comprises an upper surface (122), an opposed lower surface (not visible) and at least one side edge (124).

The rotating stage (120) comprises a central opening (126) through which the inner nozzle head (130) extends. The central opening (126) is defined in a central portion of the rotating stage (120) that co-aligns with the axis of rotation of the rotating stage (120).

The rotating stage (120) is mounted to the frame (110) at a height of about 750 mm above a support surface that coincides with the lower position of the inner nozzle head (130).

The rotating stage (120) is operably coupled to an electric drive motor for driving rotation of the rotating stage (120) about its axis of rotation.

Figure 2:
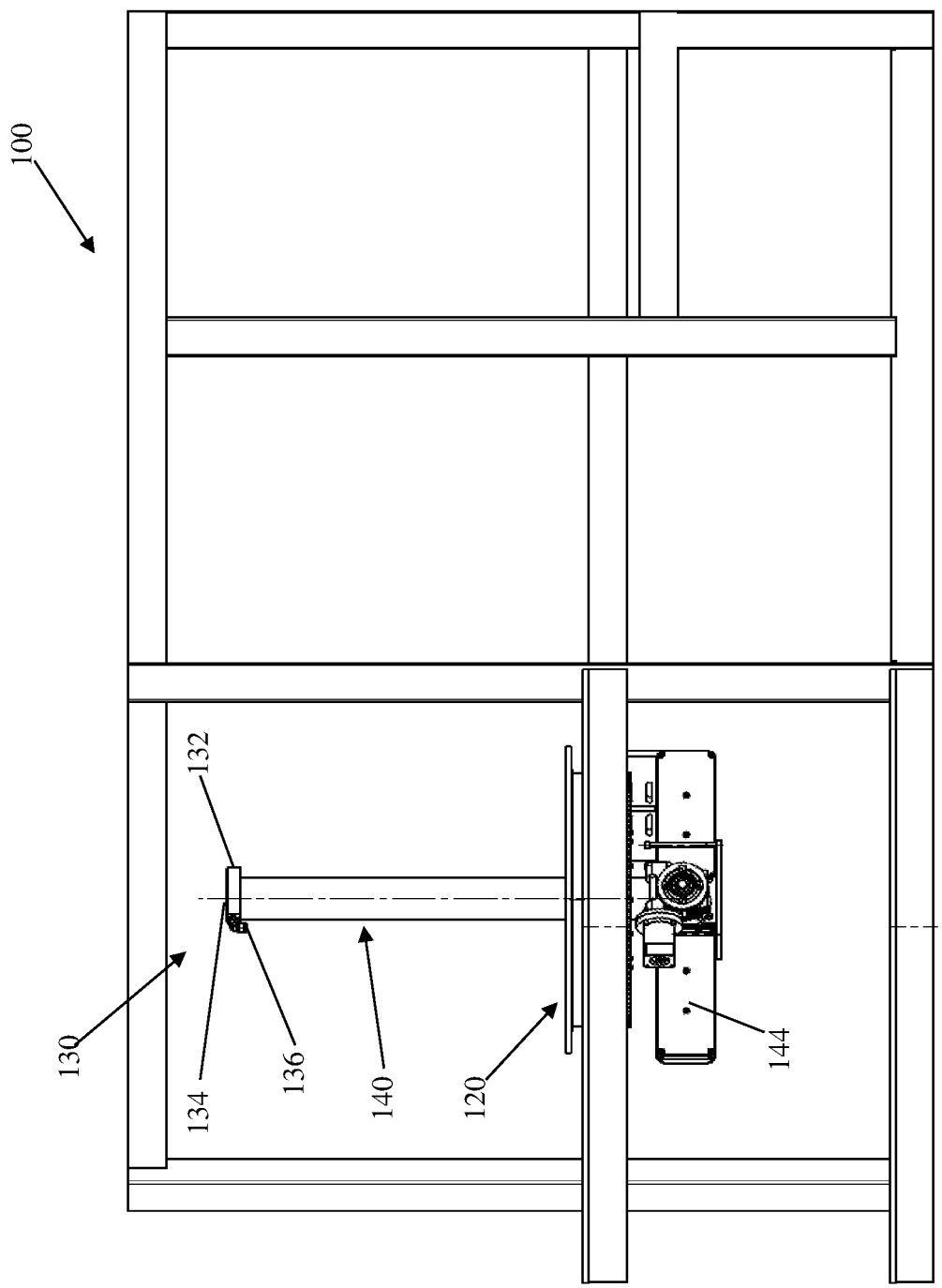
FIG. 2 is a front view of part of the air filter cleaning device as shown in FIG. 1.
Figure 4:
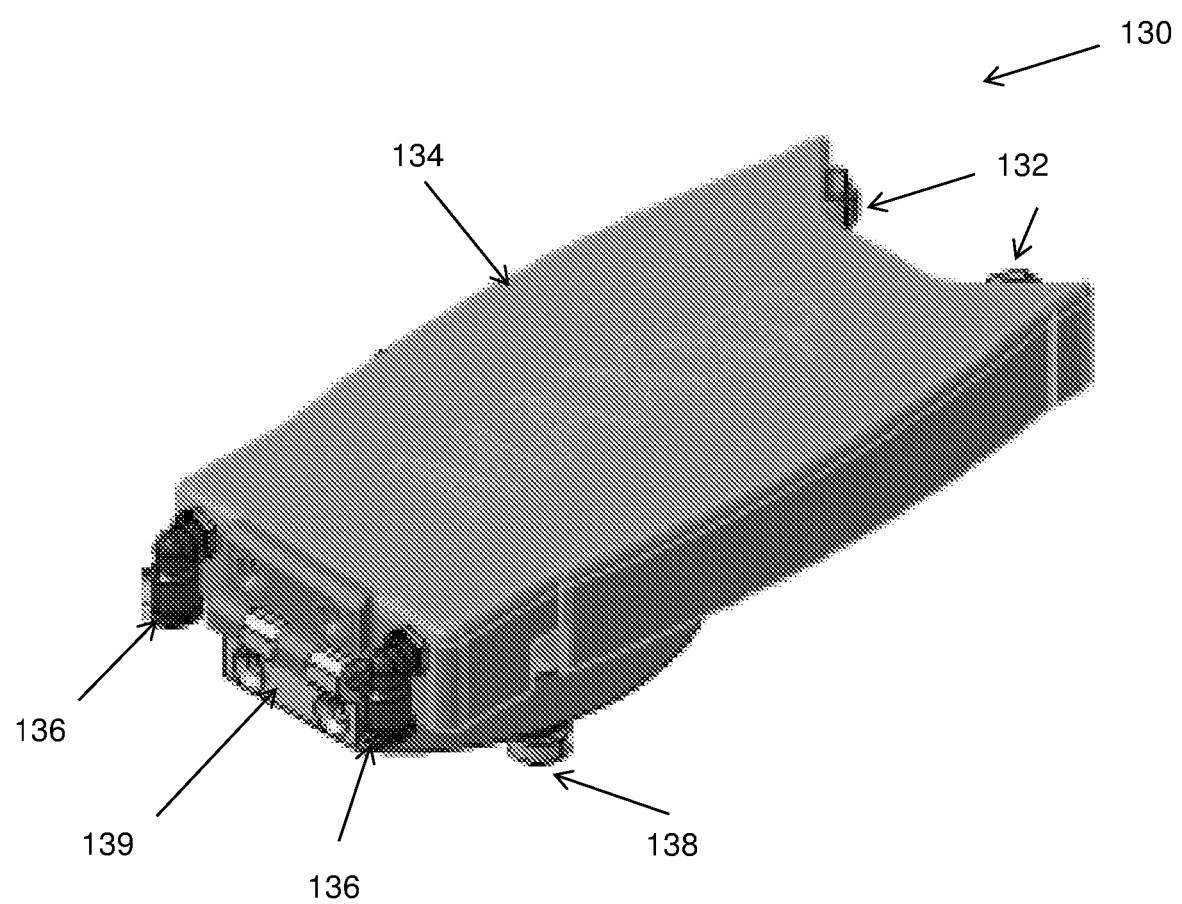
FIG. 4 is a upper perspective view of the inner outlet head of the air filter cleaning device as shown in FIG. 1.
Figure 5:
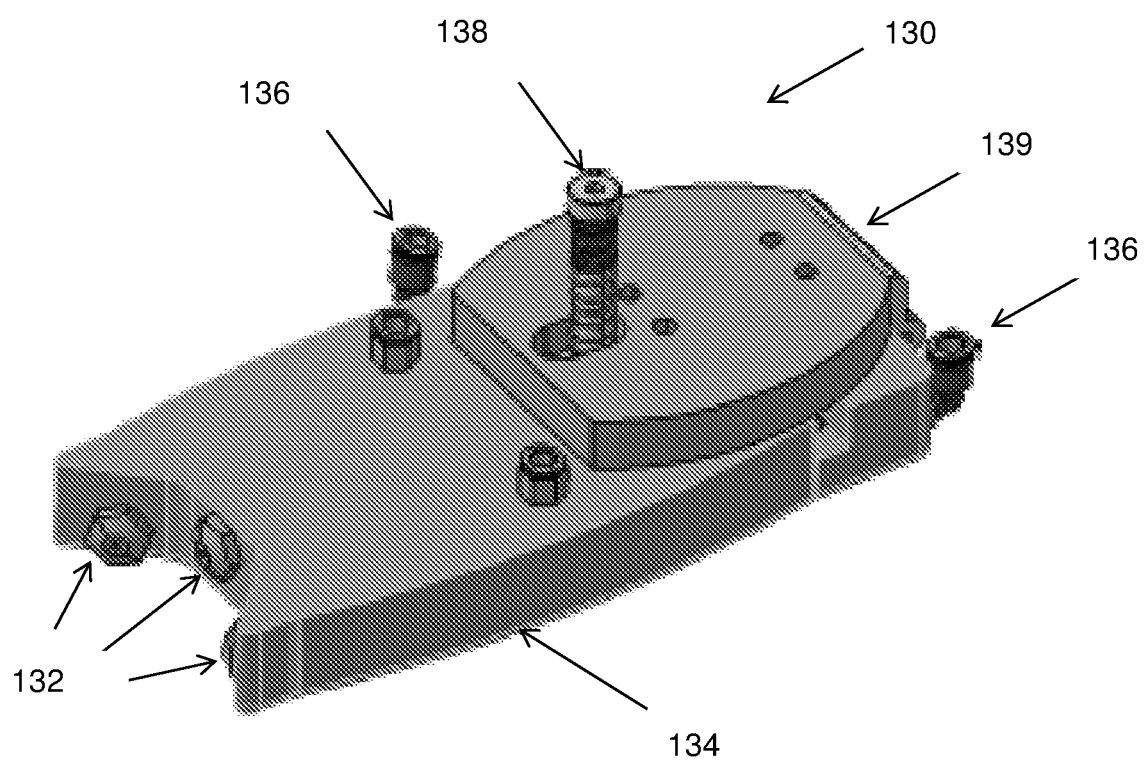
FIG. 5 is a lower perspective view of the inner outlet head of the air filter cleaning device as shown in FIG. 1.

Referring to FIGS. 2, 4 and 5, the inner nozzle head (130) comprises a body (134) having a gas inlet (136), the three outlet nozzles (132), and a forked passage (not shown) in fluid communication with the gas inlet (136) and the three outlet nozzles (132) for the passage of compressed air from the gas inlet (136) to the three nozzles (132). As shown in FIGS. 4 and 5, the inner nozzle head (130) also comprises a compression spring (138) and hinge (139) to enable spring loaded opening of the inner nozzle head (130) for easy positioning of a filter over the rigid chain actuator/elongate support (140).

The nozzles (132) are arranged on the inner nozzle head (130) such that they face a common side of the inner nozzle head (130) for discharging pressurised air outwardly through a wall of a cylindrical air filter.

The gas inlet (136) of the inner nozzle head (130) is connectable to an air compressor by a tube, pipe or hose.

As mentioned, the inner nozzle head (130) is operably coupled to the rigid chain actuator (140) configured to vertically move the inner nozzle head (130) between the lower and the upper positions along a central axis or parallel to the central axis of a cylindrical air filter seated atop the rotating stage (120).

The rigid chain actuator (140) in the form of a Tsubaki zip chain actuator comprises a pair of interlocking chains each coupled to the inner nozzle head (130) at a common end, a pair of housings (144) each configured to at least partially receive a chain and a pair of pinions (not visible) each mounted on a drive shaft within a housing (144). The pair of interlocking chains interlock in a zipper like fashion to form a single strong column that enables a push/pull operation over long strokes. The unzipped chains can be compactly housed for space saving compared to conventional pneumatic and hydraulic cylinders and enable high speed/high frequency operation, multipoint stopping and high stopping precision. In use, rotation of the pinions (not visible) moves the pair of chains between an extended column position in which the chains interlock with one another in a back-to-back arrangement and extend the inner nozzle head (130) in a substantially vertical direction upwardly from the respective housings (144) in the upper position and a retracted position in which the chains at least partially disengage from one another and at least partially retract in the housings (144) causing the inner nozzle head (130) to retract in a substantially vertical direction downwardly at least partially into the rotating stage (120) in the lower position. Each drive shaft is driven by an electric motor.

The housings (144) are fastened to an underside of the same horizontal panel supported by the frame (110) on which the rotating stage (120) is rotatably coupled.

The rigid chain actuator (140) is configured to hold the inner nozzle head (130) at a height of about 750 mm above a support surface when in the lower position and enable the inner nozzle head to be vertically moved to an upper position preferably corresponding with an upper edge of a cylindrical air filter and having a maximum height of about 1,500 mm above the support surface.

Referring back to FIG. 1, the outer vacuum head (150) is configured to be located externally to a cylindrical air filter to suction contaminants dislodged from a cylindrical air filter.

The outer vacuum head (150), like the inner nozzle head (130), comprises a body having a gas inlet (152), a gas outlet (not visible) and a passage (not visible) in fluid communication with the gas inlet (152) and the gas outlet (not visible).

The gas outlet (not visible) is connectable to an air pump for creating a partial vacuum and a container for containing contaminants removed by the outer vacuum head (150). The gas outlet (not visible) is connectable to the air pump and the container by a tube, pipe or hose.

Figure 3:
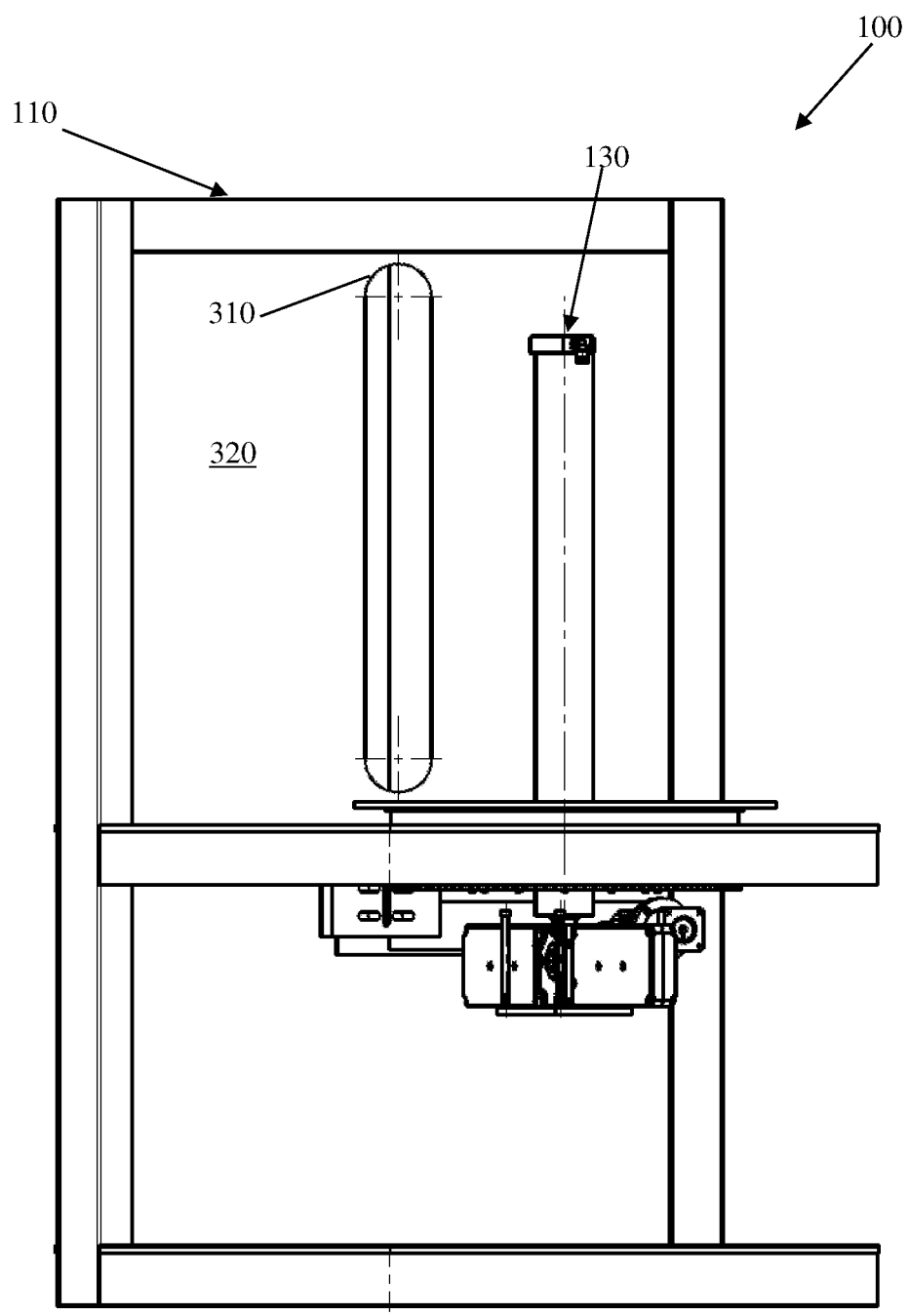
FIG. 3 is an end view of the air filter cleaning device as shown in FIG. 2.

Best shown in FIG. 3, the outer vacuum head (not shown) at least partially extends through an elongate opening (310) defined in a vertical panel wall (320) fitted to the frame (110) and facing the inner nozzle head (130). The elongate opening (310) is configured to allow the vacuum head (not shown) to be moved in a substantially vertical direction to at least mirror the movement of the inner nozzle head (130) to enhance suction and removal of the contaminants dislodged from a cylindrical air filter.

A method of cleaning an air filter using the air filter cleaning device (100) of the present invention is now described in detailed with reference to FIG. 1.

The method comprises an initial step of measuring a pressure drop across an air filter to be cleaned with a first pressure differential test.

The method then comprises seating the cylindrical air filter atop the upper surface (122) of the rotating state (120) and aligning the cylindrical air filter relative to the rotating stage (120) such that the central axis of the cylindrical air filter co-aligns with the axis of rotation of the rotating stage (120).

Once seated and aligned, the method comprises discharging pressurised air outwardly through a wall of the cylindrical air filter with the three nozzles (132) of the inner nozzle head (130) to dislodge contaminants from the air filter. Simultaneously, the cylindrical air filter rotates atop the rotating stage (120) and the inner nozzle head (130) is vertically moved between the lower position and the upper position via the rigid chain actuator (140).

The outer vacuum head (150) is contemporaneously used to suction contaminants dislodged from the cylindrical air filter by the pressurised air.

The method comprises a final step of re-measuring the pressure drop across the cylindrical air filter with a second pressure differential test.

If the pressure drop re-measured across the cylindrical air filter during the second pressure differential test is within an allowable range, the cylindrical air filter may be considered clean and be re-used.

If, however, the pressure drop re-measured across the cylindrical air filter does not fall within the allowable range or does not exhibit a significant improvement over the pressure drop initially measured with the first pressure differential test, the above method is repeated.

Thus the present invention has a number of advantages over the prior art such as:

Improved ease of use in positioning and cleaning an air filter; and

Improved efficiency in cleaning an air filter.

Reference throughout this specification to "one embodiment" or "an embodiment" means that a particular feature, structure, or characteristic described in connection with the embodiment is comprised in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An air filter cleaning device comprising:
   a rotating stage on which an air filter to be cleaned is seated and rotated about its central axis, said rotating stage comprising a central opening;
   an inner outlet head configured to extend through the central opening of the rotating stage and be vertically moveable between a lower position and an upper position at least parallel to the central axis of the air filter seated atop the rotating stage, said inner outlet head having at least one gas outlet for discharging pressurised gas outwardly through at least one wall of the air filter for dislodging contaminants; and
   an outer vacuum head located externally to the air filter to suction the contaminants dislodged from the air filter by the inner outlet head,
   wherein said inner outlet head, when in the lower position, is configured to be located less than about 1,500 mm above a support surface for the air filter cleaning device.

2. The air filter cleaning device of claim 1, wherein:
   the air filter comprises filter media arranged in a tubular shape having at least one inner sidewall and at least one opposed outer sidewall, and the air filter comprises opposed annular shaped end members located at each end of the at least one filter media; or,
   the central opening is defined in a central portion of the rotating stage, and wherein the central opening co-aligns with an axis of rotation of the rotating stage; or,
   the at least one gas outlet is in the form of a nozzle; or,
   the inner outlet head, when in the lower position, is located at substantially the same height above the support surface as the rotating stage such that an upper surface of the inner outlet head is substantially flush with the upper surface of the rotating stage; or,
   the inner outlet head has an upper position that suitably corresponds with an upper edge or rim of an air filter seated atop the rotating stage; or,
   the vacuum head is mounted in the device such that it faces a longitudinal side of the air filter; or,
   the air filter is cylindrical in shape.

3. The air filter cleaning device of claim 1, further comprising: a frame comprising at least three vertically extending frame members joined together by a plurality of horizontally extending frame members, the plurality of horizontally extending frame members comprising one or more frame members extending between the lower ends of the vertically extending frame members and a support surface facing wall of each of the one or more horizontally extending frame members may rest on the support surface to support the frame in an erect position.

4. The air filter cleaning device of claim 1, wherein the rotating stage is substantially disc-shaped.

5. The air filter cleaning device of claim 4, wherein the rotating stage has two opposed surfaces comprising an upper surface and an opposed lower surface, the opposed surfaces substantially parallel to one another and be interconnected by at least one side edge.

6. The air filter cleaning device of claim 3, wherein:
   the rotating stage is rotatably coupled to the frame such that it may rotate about its axis of rotation in a substantially horizontal plane; or,
   the rotating stage is rotatably coupled to a panel supported by the frame; or,
   the rotating stage is driven about its axis of rotation by a drive motor operably coupled to the frame and the rotating stage.

7. The air filter cleaning device of claim 3, wherein the rotating stage comprises an upper portion and a lower portion, wherein the lower portion configured to be fastened to a part of the frame of the device, either directly or indirectly, and the upper portion comprises two opposed surfaces and the at least one side edge, configured to be rotatable relative to the lower portion.

8. The air filter cleaning device of claim 7, wherein the lower portion of the rotating stage is fastened to one or more of the horizontally extending frame members of the frame of the device.

9. The air filter cleaning device of claim 1, wherein the inner outlet head comprises a body having a gas inlet, and a passage in fluid communication with the gas inlet and the at least one gas outlet.

10. The air filter cleaning device of claim 9, wherein:
    the gas inlet is connectable to a source of gas in the form of compressed air; or,
    the outlet head comprises more than one gas outlet, and wherein the passage in the body of the outlet head comprises one or more forks in fluid communication between the gas inlet and the more than one gas outlet.

11. The air filter cleaning device of claim 1, comprising an elongate support which has an adjustable longitudinal length or height for vertically moving the inner outlet head, operatively coupled to the upper end, between the lower and upper positions.

12. The air filter cleaning device of claim 11, wherein:
the elongate support comprises two or more telescopic members capable of moving between an extended position and a retracted position, and wherein the extended position corresponds with the upper position and the retracted position may correspond with the lower position; or,
the elongate support is in the form of a linear actuator capable of moving between an extended position and a retracted position.

13. The air filter cleaning device of claim 11, wherein the linear actuator comprises a rigid chain actuator comprising at least one housing, a pinion at least partially housed in the housing and at least one chain also at least partially housed in the housing and operatively associated with the pinion such that when the pinion rotates the chain moves between the extended position in which the chain extends vertically upwardly from the housing in a rigid linear column form and the retracted position in which the chain is at least partially retracted into the housing and folds on itself.

14. The air filter cleaning device of claim 13, wherein:
the rigid chain actuator comprises a single chain coupled at one end to the inner outlet head such that rotation of the pinion moves the chain between an extended column position in which the inner outlet head extends in a substantially vertical direction upwardly from the housing in the upper position and a retracted position in which the chain is at least partially retracted within the housing causing the inner outlet head to retract in a substantially vertical direction downwardly at least partially into the rotating stage in the lower position; or,
the rigid chain actuator comprises a pair of interlocking chains each coupled at a common end to the inner outlet head such that rotation of a pinion associated with each chain moves the chains between an extended column position in which the chains interlock with one another in a back-to-back arrangement and extend the inner outlet head in a substantially vertical direction upwardly from the at least one housing in the upper position and a retracted position in which the chains at least partially disengage from one another and at least partially retract into the housings causing the inner outlet head to retract in a substantially vertical direction downwardly at least partially into the rotating stage in the lower position; or,
the at least one housing of the rigid chain actuator is located beneath the rotating stage.

15. The air filter cleaning device of claim 1, wherein the vacuum head comprises a body having at least one gas inlet, a gas outlet and a passage in fluid communication with the at least one gas inlet and the gas outlet.

16. The air filter cleaning device of claim 15, wherein:
the gas outlet is connectable to an air pump for creating a partial vacuum and a container for containing contaminants removed by the outer vacuum head; and/or,
the vacuum head comprises more than one gas inlet, and wherein the passage in the body of the vacuum head comprises one or more forks in fluid communication between the more than one gas inlet and the gas outlet.

17. The air filter cleaning device of claim 1, wherein the vacuum head at least partially extends through an opening defined in a vertical panel wall fitted to a frame of the device and facing the inner outlet head.

18. The air filter cleaning device of claim 17, wherein the opening is elongate and is configured to allow the vacuum head to be moved in a substantially vertical direction to at least mirror the movement of the inner outlet head.

19. The air filter cleaning device of claim 1, further comprising an enclosure for at least partially enclosing a cleaning chamber comprising the rotating stage and at least part of the inner outlet head and the outer vacuum head.

20. The air filter cleaning device of claim 19, wherein at least one panel forming the enclosure:
is at least partially transparent to allow an operator to view an interior of the enclosure; and/or,
hingedly connected to a frame of the device so that the panel may function as a door for at least allowing air filters to be interchangeably placed atop the rotating stage for cleaning.

21. An inner outlet head for use or when used with the air filter cleaning device of claim 1, said inner outlet head configured to extend through a central opening of a rotating stage of the air filter cleaning device and be vertically moveable between a lower position and an upper position at least parallel to a central axis of a air filter seated atop the rotating stage, said inner outlet head having at least one gas outlet for discharging pressurised gas outwardly through at least one wall of the air filter for dislodging contaminants, said inner outlet head further configured to be located less than about 1,500 mm above a support surface for the air filter cleaning device when in the lower position.

22. A method of cleaning a air filter, said method comprising:
seating the air filter atop the rotating stage of the air filter cleaning device of claim 1; and
discharging pressurised gas outwardly through at least one wall of the air filter with the at least one gas outlet of the inner outlet head to dislodge contaminants from the air filter while the air filter rotates atop the rotating stage and the inner outlet head moves vertically between the lower position and the upper position at least parallel to a central axis of the air filter.

23. The method of claim 22, further comprising an initial step of measuring a first pressure drop across said air filter with a first pressure differential test.

24. The method of claim 22, wherein the step of seating the air filter comprises aligning the air filter such that its central axis at least partially aligns with the axis of rotation of the rotating stage; and/or,
the discharging step comprises discharging pressurised air through the at least one wall of the air filter; and/or,
the inner outlet head moves between the lower and upper positions along the central axis of the air filter.

25. The method of claim 22, further comprising suctioning contaminants dislodged from the at least one wall of the air filter with the outer vacuum head.

26. The method of claim 25, wherein said suctioning occurs contemporaneously with said discharging of pressurised gas.

27. The method of claim 23, further comprising measuring a second pressure drop across said air filter following said discharging with a second pressure differential test.

28. The method of claim 27, wherein the second pressure drop across the air filter does not fall within an allowable range or does not exhibit a significant improvement over the first pressure drop measured during the first pressure differential test, said discharging and said suctioning are repeated.

* * * * *